(12) United States Patent
Kirschbaum et al.

(10) Patent No.: US 10,165,126 B2
(45) Date of Patent: Dec. 25, 2018

(54) METHOD FOR SECURING A TRANSACTION BETWEEN A MOBILE TERMINAL AND A SERVER OF A SERVICE PROVIDER THROUGH A PLATFORM

(71) Applicant: ORANGE, Paris (FR)

(72) Inventors: Patrick Kirschbaum, Poigny la Foret (FR); Arnaud Brun, Boulogne Billancourt (FR)

(73) Assignee: Orange, Paris (FR)

( * ) Notice: Subject to any disclaimer, the term of this patent is extended or adjusted under 35 U.S.C. 154(b) by 92 days.

(21) Appl. No.: 14/939,826

(22) Filed: Nov. 12, 2015

(65) Prior Publication Data

US 2016/0142555 A1 May 19, 2016

(30) Foreign Application Priority Data

Nov. 14, 2014 (FR) ..................... 14 60995

(51) Int. Cl.
| | | |
|---|---|---|
| *H04M 15/00* | (2006.01) | |
| *G06Q 20/32* | (2012.01) | |
| *G06Q 20/38* | (2012.01) | |
| *H04W 4/24* | (2018.01) | |
| *H04W 12/02* | (2009.01) | |
| *H04W 12/06* | (2009.01) | |

(52) U.S. Cl.
CPC .......... *H04M 15/48* (2013.01); *G06Q 20/322* (2013.01); *G06Q 20/383* (2013.01); *G06Q 20/385* (2013.01); *H04M 15/09* (2013.01); *H04W 4/24* (2013.01); *H04W 12/02* (2013.01); *H04W 12/06* (2013.01)

(58) Field of Classification Search
CPC ....................................................... H04M 15/48
See application file for complete search history.

(56) References Cited

U.S. PATENT DOCUMENTS

| | | | |
|---|---|---|---|
| 2009/0254440 A1 | 10/2009 | Pharris | |
| 2015/0095174 A1* | 4/2015 | Dua ...................... | G06Q 20/20 705/21 |
| 2016/0092874 A1* | 3/2016 | O'Regan ................ | G06Q 20/40 705/44 |
| 2016/0132880 A1* | 5/2016 | O'Regan ............ | G06Q 20/3278 705/44 |

FOREIGN PATENT DOCUMENTS

| | | |
|---|---|---|
| WO | WO 2001/026061 | 4/2001 |
| WO | WO 2009/112793 | 9/2009 |
| WO | WO 2012/168457 | 12/2012 |

OTHER PUBLICATIONS

French Search Report dated Jul. 10, 2015 in corresponding French Application No. 1460995, filed Nov. 14, 2014; 2 pages.

* cited by examiner

*Primary Examiner* — Mazda Sabouri (74) *Attorney, Agent, or Firm* — Knobbe Martens Olson & Bear LLP (57) ABSTRACT

One embodiment relates to a method for securing a transaction between a mobile terminal of a user and a server of a service provider through a platform capable of being connected to the mobile terminal via a mobile network of an operator, to the server of the service provider and to a transaction execution system.

19 Claims, 7 Drawing Sheets

Mobile site
of the trader

FIG. 7b

Mobile site
of the trader

METHOD FOR SECURING A TRANSACTION BETWEEN A MOBILE TERMINAL AND A SERVER OF A SERVICE PROVIDER THROUGH A PLATFORM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entireties. In particular, the disclosure of French Patent Application FR 1460995, filed Nov. 14, 2014, is incorporated herein by reference in its entirety.

GENERAL TECHNICAL FIELD

One embodiment described herein relates to the securing of data exchanges between a mobile terminal and a server.

It especially relates to a method for securing a transaction between this terminal and the server of a service provider by way of a service platform capable of being connected to a mobile network managed by an operator.

PRIOR ART

The provision of goods or services by a service provider to a client very often requires in exchange the carrying out of a transaction between this service provider and this client. Most service providers offer their clients a secure method of payment by bank card in order to implement such a transaction. To do this, a service provider must have access to a dedicated fixed payment terminal connected to a banking server by way of a communications network. However, such a solution may not be suitable for certain roaming service providers such as workers, tradespeople or taxi drivers. Moreover, the use of a bank card guarantees neither the anonymity of its user (since the user's name features on the card), nor the confidentiality of his or her bank data, as the information featured on the card can make it possible to make a purchase over the Internet without knowing the associated bank card code.

Online payment solutions offer a dematerialized and secure payment not requiring the service provider to own a dedicated terminal. Such payment solutions guarantee the anonymity of the user vis-à-vis the service provider. Moreover, the use of the platform of the payment solution as a trusted third party makes it possible to guarantee the confidentiality of the banking data of the solution user, which are not transmitted to the service provider.

However, such solutions operate over the Internet network and require the user to enter an identifier and password on a terminal connected to the network to carry out a transaction. Many hacking techniques allow hackers to gain knowledge of this identifier and this password, to then usurp the identity of the user as seen by the payment solution and order transactions of which the user is unaware. To do this such hackers can for example intercept communications between the user and the server of the payment solution, hack said server, or else install spyware on the terminal of the user.

In addition, such solutions are ill-suited to use in situations where neither the client nor the service provider can easily access a fixed terminal, such as aboard a taxi or else at a market or stall. This is because the use of such payment solutions often requires the user to enter numerous items of data such as his/her identifier, his/her password, an amount, an identifier of the service provider etc. A transaction by way of such a service can then be difficult to implement by way of a mobile terminal.

There is therefore a need for a method making it possible to securely implement a transaction, for example a banking transaction or a payment, between a user and a service provider, without necessitating the use of a fixed or dedicated terminal and without requiring the user to enter numerous items of data. Such a form of security must in particular guarantee the anonymity of the user and the confidentiality of his/her banking data vis-à-vis the service provider or a possible hacker.

PRESENTATION OF THE INVENTION

A first aspect thus pertains, to a method for securing a transaction between a mobile terminal of a user and a server of a service provider through a platform capable of being connected to the mobile terminal via a mobile network of an operator, to the server of the service provider and to a transaction execution system, the method comprising the following processes implemented by said platform:

storage of a match between an item of alias data, associated with a user identifier via which the mobile terminal is identified to the mobile network of the operator, and a code for identifying the user to the transaction execution system, reception of the item of alias data upon the setting up of a connection between the mobile terminal and the platform through the mobile network and following the identification of the mobile terminal by the mobile network via said user identifier, linking of the mobile terminal of the user with the server of the service provider through the platform and via the mobile network, said item of alias data serving to identify the mobile terminal to said server of the service provider, reception of transaction data representing a transaction to be executed between the user of the mobile terminal and said service provider, transmission to the transaction execution system of an order to execute the transaction comprising said user identification code and a code identifying the service provider to the transaction execution system, so that the transaction execution system implements said transaction.

In this method, the platform serves at once as a communication intermediary, a transaction execution terminal and a trusted third party between the mobile terminal of the user, the server of the service provider and the transaction execution system.

As a trusted third party, the platform is used for the storage of confidential data on the identity of the user, such as for example the item of alias data and the code identifying this user to the transaction execution system.

As a communication intermediary, the platform allows an anonymized linking of the user through his/her mobile terminal to the service provider, wherein the user is only known to the service provider through his/her item of alias data. This linking is performed in a secure manner via the mobile network, particularly in that it is the user identifier, via which the mobile terminal is identified to the mobile network, that enables the determination of the item of alias data used for the linking with the service provider. Thus, when the platform is implemented by the operator of the mobile network and is thus connected to the network infrastructure of this mobile network, only this mobile network operator will be able to determine the item of alias data allowing the linking.

As a transaction execution terminal, the platform is used to receive data representing a transaction to be executed and to transmit a transaction execution order to the transaction execution system. In the case of a payment transaction, the platform thus plays the role of a fixed payment terminal. This hence makes it possible to execute a transaction without needing to deploy a dedicated payment terminal over each geographical site in which the user needs to make a payment or execute a transaction.

Such a method thus makes it possible to carry out a secure transaction between the user and the service provider without either the mobile terminal user's identity or identification codes for the transaction execution system being disclosed to the service provider.

The process of storing a match of the method, according to the first aspect, can comprise the storage of a match between an identifier of the service provider and said code for identifying the service provider to the transaction execution system.

The platform thus stores the banking details of the service provider, so that it can subsequently communicate them to the banking system for the implementation of a transaction.

The transaction data can comprise a transaction code which identifies the transaction to be executed to the service provider, an identification of at least one service or product to be provided by the service provider and/or a transaction amount.

The method according to the first aspect may further comprise the following processes:

storage of a user authentication code in association with the identification code of the user, transmission to the mobile terminal of a request for the entering of said authentication code, reception of a code entered by said user and comparison of the code entered with the stored authentication code, transmission of the order to execute the transaction if the code entered and the stored authentication code are identical.

In such a manner of implementation, the platform stores another confidential data item, namely an authentication code of this user, and performs a verification of this authentication code. The verification of such an authentication code by the platform makes it possible to guard against the usurpation of identity by a hacker who has stolen the user's mobile terminal.

The process of reception of transaction data in the method according to the first aspect can comprise:

the reception of transaction data originating from the mobile terminal following the entering of said transaction data performed via said mobile terminal;

the generation of said order to execute the transaction on the basis of said transaction data received and the item of alias data.

The process of reception of transaction data can comprise the reception and the transmission to the server of the service provider of the transaction code following the entering of said transaction code performed via said mobile terminal.

This transaction code acts as a connection between the transaction to be implemented and the mobile terminal of the user via which the validation of the transaction is done. In particular, it makes it possible to form an association between the item of alias data and the transaction.

This makes it possible to transmit to the service provider the transaction code and the item of alias data of the user without the service provider and the user being in direct contact. The service provider thus gains knowledge of the user's desire to set up a transaction with him/her/it for an amount corresponding to the transaction code and can identify the mobile terminal of the user by its item of alias data, while preserving the anonymity of the user.

Said transaction code being associated with an amount of the transaction, following the reception of said transaction code, the process of reception of transaction data in the method according to the first aspect can comprise a matching of the item of alias data of the user of the mobile terminal, with the amount of the transaction and with the identifier of said service provider;

Such a matching process has the aim of defining the transaction, i.e. connecting: the item of alias data of the user, identifying the mobile terminal of the user without revealing his/her identity, the identifier of the service provider, identifying the service provider with which the user of the mobile terminal wishes to conduct a transaction, and the amount of this transaction.

In a first mode of implementation, the matching process in the method according to the first aspect further comprises the following prior processes:

determination of the amount of said transaction matching said received transaction code;

transmission to the mobile terminal of a validation request message comprising the determined transaction amount;

reception of a transaction validation message transmitted by the mobile terminal, said message comprises the item of alias data of the user of the mobile terminal, the amount of said transaction and the identifier of said service provider to the platform;

and wherein the order to execute the transaction is transmitted to the transaction execution system if the validation message coming from the mobile terminal is received by the platform.

The user can thus confirm his/her desire to commit to a transaction with this service provider for such an amount and give the platform all the information it needs to have the transaction executed by the transaction execution system.

In a second mode of implementation, the matching process in the method according to the first aspect further comprises the prior reception of a transaction request message transmitted by the server of the service provider, said message comprising the item of alias data of the user of the mobile terminal, an amount of said transaction and the identifier of said service provider to the platform;

The transaction can thus be required from the platform directly by the service provider, without requiring an additional intervention from the user of the mobile terminal, as soon as the service provider knows which user terminal, identified by its item of alias data, wishes to initiate a transaction and for what amount.

The transaction code can be a code associated temporarily by the server of the service provider with the transaction amount or a code identifying a device capable of supplying the transaction amount to said service provider.

The user identifier can be an identifier associated with a user identification module of the mobile terminal.

This makes it possible to guarantee that the user identifier employed is correctly identifying the mobile terminal of the user.

The linking in the method according to the first aspect can be carried out securely through a virtual private network (VPN) set up between the platform and the server of the service provider.

This makes it possible to reinforce the security of the data exchanges between the platform and the service providers, any device external to the network of the operator attempting to connect to a server of a service provider being rejected.

The storage process in the method according to the first aspect can further comprise a prior process of reception of a message of registration of said service provider transmitted by said server of the service provider and comprising the identification code of the service provider.

The service provider can thus register with the secure transaction service of the platform by providing it with his/her bank data, so as not to have to transmit it again in a secure transaction. The service provider can thus be one of the providers the platform can suggest to a user for the user to initiate a transaction with.

The storage process in the method according to the first aspect can further comprise a prior process of reception of a message of registration of the user of the mobile terminal transmitted by the mobile terminal and comprising the identification code of the user and optionally the authentication code of the user.

The user of the mobile terminal can thus register with the secure transaction service of the platform by providing it with his/her bank data, so as not to have to transmit to it again in a secure transaction. The user can also optionally choose his/her authentication code him/herself, for example in order for it to be easier to remember.

A second aspect pertains to a computer program product comprising code instructions for the execution of a method according to the first aspect when this program is executed by a processor.

A third aspect pertains to a platform capable of being connected to a mobile terminal of a user via a mobile network of an operator, to a server of a service provider and to a transaction execution system, and of securing a transaction between said mobile terminal of said user and said server of said service provider, wherein it is capable of being linked to a storage device to store a match between an item of alias data, associated with a user identifier via which the mobile terminal is identified to the mobile network of the operator, and a code for identifying the user to the transaction execution system, and wherein it comprises:

an interface module which receives the item of alias data upon the setting up of a connection of the mobile terminal to the platform through the mobile network and following the identification of the mobile terminal by the mobile network via said user identifier, a data processing module which links, through the platform and via the mobile network, the mobile terminal of the user with the server of the service provider, said item of alias data serving to identify the mobile terminal to said server of the service provider, an interface module which receives transaction data representing a transaction to be executed between the user of the mobile terminal and said service provider, an interface module which transmits to the transaction execution system an order to execute the transaction comprising said identifier code of the user and a code for identifying the service provider to the transaction execution system, so that the transaction execution system implements said transaction.

Such a computer program product and platform have the same advantages as those described for the method according to the first aspect.

PRESENTATION OF THE FIGURES

Other features and advantages will become apparent on reading the following description of an embodiment. This description will be given with reference to the appended drawings wherein.

DETAILED DESCRIPTION

Figure 1:
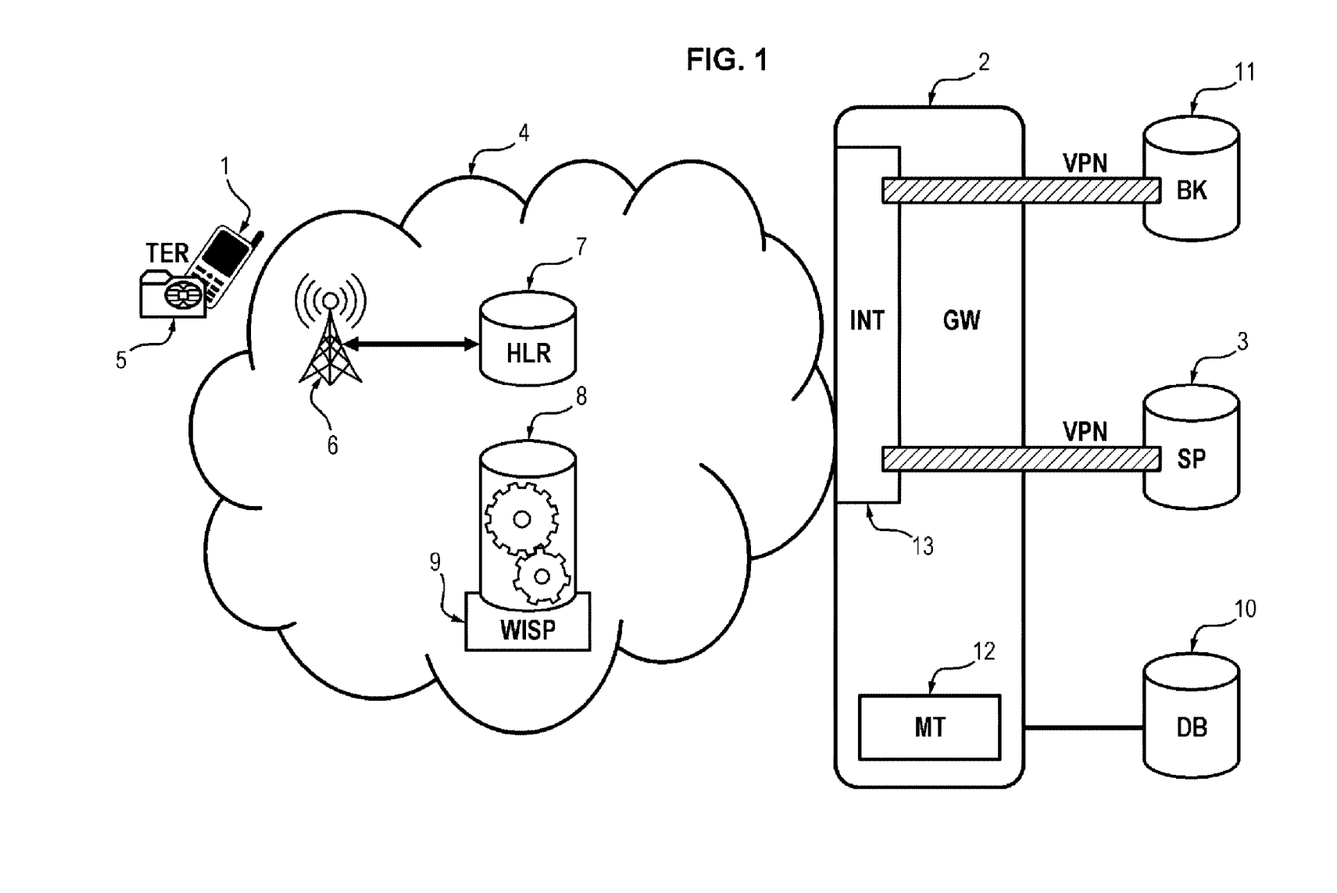
FIG. 1 schematically illustrates hardware for a possible implementation of the invention.

With reference to FIG. 1, one embodiment relates to a method for securing a transaction between a mobile terminal 1 of a user and a server 3 of a service provider through a platform 2 capable of being connected to the mobile terminal 1 via a mobile network 4 managed by an operator, to the server 3 of a service provider and to a transaction execution system 11. In the exemplary application described below, the transaction execution system is a banking system 11 for executing payment transactions.

The mobile terminal 1 is capable of being connected to the mobile network 4 and can comprise a secure element 5. Such a secure element 5 is capable of storing secure data in a memory, and can for example consist of a chip card including a microprocessor connected by a data bus to a RAM and to a rewritable non-volatile memory such as a flash memory or an EEPROM memory and securely storing in its non-volatile memory data and applications executable by said microprocessor. The secure element is typically a SIM (Subscriber Identity Module) card often known as a "subscriber identification module", named "user identification module" in this document.

Upon connection to the mobile network, the mobile terminal is identified by the mobile network of the operator via at least one user identifier.

This user identifier is an identifier associated with the secure element 5, for example the subscriber identifier (IMSI, or International Mobile Subscriber Identity number) and/or the call number (MSISDN, or Mobile Station Integrated Service Digital Network Number). Such a user identifier is unique and also serves as an identifier of the user identification module.

Regarding this, the concept of user identifier represents indiscriminately in this document:

a user as a physical person, the subscriber of a client account with a mobile network operator (whether it is a client account with or without subscription, with or without prepaid account etc.), and a user as a mobile terminal, connected to the mobile network, identified and differentiated from the other mobile terminals connected via the user identification module housed in this terminal.

The user, a physical person, having subscribed to a client account with the operator of the mobile network is acknowledged via such a user identifier as a user, in theory, of the mobile terminal through a user identifier module housed in the mobile terminal used, whoever the physical person effectively using this mobile terminal and whatever the mobile terminal in which the identification module is housed.

The method described below is implemented by the platform 2 and allows the secure implementation of a transaction between the server of the service provider 3 and the mobile terminal 1 without disclosing to the service provider either the identity of the user or the bank details of the user.

To do this, the platform 2 is positioned as an intermediary between the mobile terminal 1 and the server 3. The mobile terminal of the user is only identified to the server 3 by an item of alias data. The match between this alias and the real identity of the user of the mobile terminal remains unknown to the server 3 which never enters into direct communication with the mobile terminal 1. In addition, the items of alias data are unusable in any other context or by any other entity of the network. The use of such an alias for the identification of the mobile terminal by the server of the service provider also makes it possible to avoid the user of the mobile terminal having to enter an identifier and a password to identify him/herself to the server.

The platform 2 is also positioned as an intermediary between the banking system 11 and the parties taking part in the transaction, i.e. the user and the service provider. To do this, the platform 2 can be linked to a storage device 10, in the form for example of a database, which can store an identifier of the service provider to the platform associated with a code for identifying the service provider to the banking system. Such an identifier can be the name of the provider, his/her/its company name, or any other encoded data making it possible to identify the service provider such as the IP address of his/her/its server.

The storage device 10 can also store a match between:
the item of alias data associated with the user identifier via which the mobile terminal of the user is identified to the mobile network of the operator, the item of alias data identifying the mobile terminal to the server of the service provider;
and a code for identifying the user of the mobile terminal to the transaction execution system.

Such codes for identifying the user of the mobile terminal and the service provider can be a bank card number or else an account number such as an identifier of RIB or IBAN type.

The storage device can also store an authentication code related to the user that the user must enter upon each transaction to validate the transaction and authorize the banking system to implement it for the benefit of the service provider.

The mobile terminal 1 of the user can comprise a mobile telephone, a "smartphone", a tablet, a games console, a laptop, a PDA (Personal Digital Assistant) or any other mobile terminal equipped with a secure element 5 and wireless communication components allowing it to access the mobile network 4. The mobile terminal 1 can be a mobile telephone of any type, equipped or otherwise with a large screen, a GPS chip, and touch-sensitive entering components. The mobile terminal 1 includes at least one software application, such as a browser, capable of displaying a page of internet page type such as an HTML or PHP page or more generally setting up a communication link with a remote server. Thus such a mobile terminal 1 is not necessarily a "smartphone".

The server of the service provider 3 comprises a RAM and storage components such as a rewritable non-volatile memory (flash memory or EEPROM) that can store a database and processing components including a processor. The server can also comprise interface components allowing it to connect to the platform 2, of wired type such as an Ethernet link, or wireless such as a Wi-Fi or Bluetooth connection. Such a server can also be connected by way of a USB, Ethernet, Firewire, eSata, etc. connection to an external hard disk or a network hard disk (NAS). Such a server is dedicated to providing a service or a product to a user and can also provide a mobile site intended to be displayed by the browser of the user's mobile terminal 1. Such an online service can be provided by the service provider on behalf of a physical establishment such as a store, a museum, an exhibition center etc.

The platform 2 can comprise a proxy server, a data processing module 12 comprising a processor and storage components such as a rewritable non-volatile memory (flash memory or EEPROM) that can store or be linked to a database, in particular the storage device 10 described above. Said platform 2 can also comprise an interface module 13, of wired type such as an Ethernet link, or wireless type such as a Wi-Fi or Bluetooth connection allowing it to connect firstly to said mobile network and secondly to the server 3 of the service provider and to the banking system 11.

VPNs (Virtual Private Networks) can be set up between the platform 2 and the server 3 of the service provider. Such virtual private networks can be seen as an extension of the local networks and make it possible to preserve the logical security that is possible inside a local network. They correspond in effect to an interconnection of local networks via a "tunnel" technique making it possible to secure the transmitted data by the implementation of cryptographic algorithms. Thus a service provider can refuse any communication coming from another entity than the platform and is inaccessible to search engines and Internet robots, as well as to hackers attempting to connect to it. The security of the data exchanges between the platform and the server of the service provider is thus greatly improved thereby.

Figure 2:
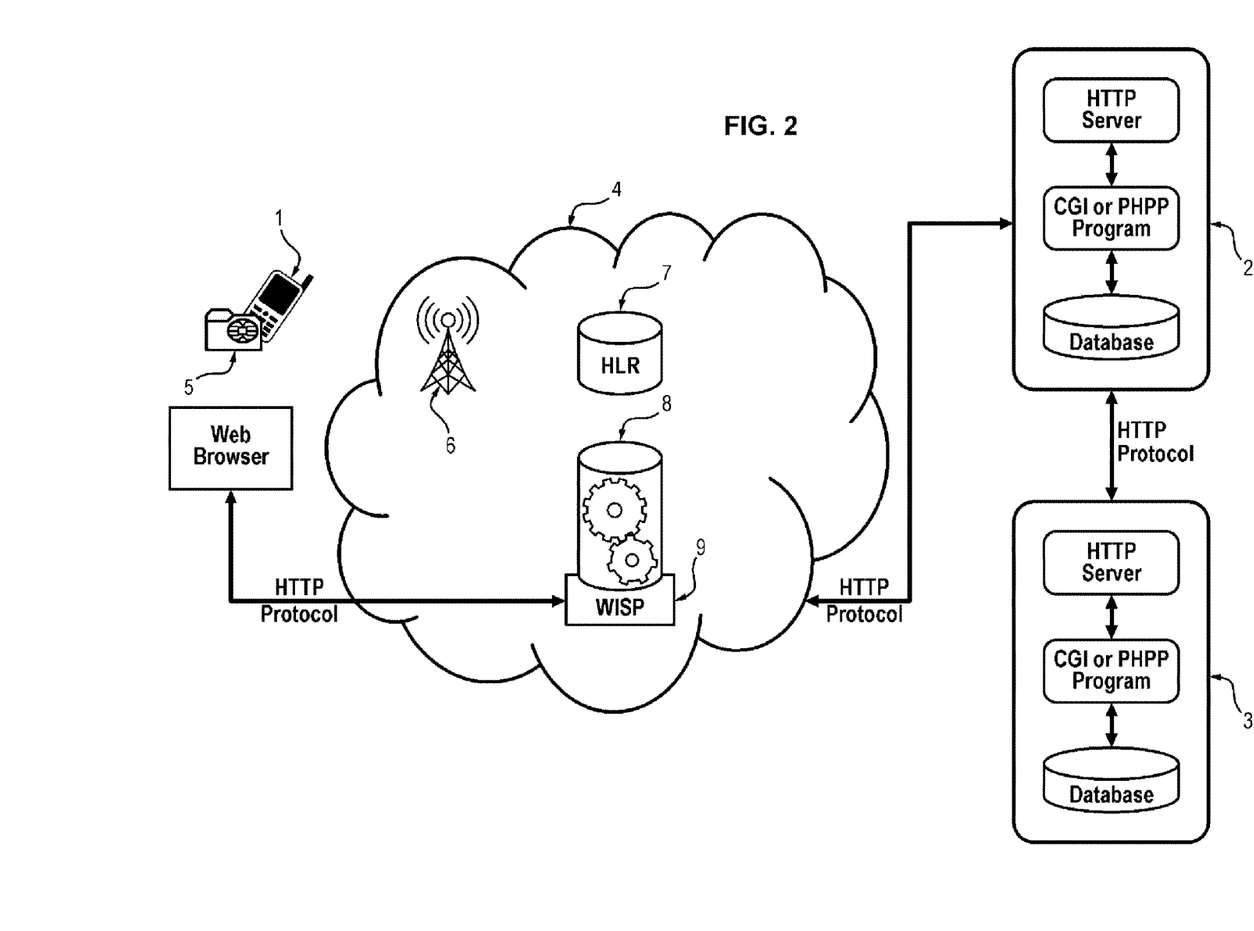
FIG. 2 schematically illustrates hardware for a possible implementation of the invention according to which the communications use the HTTP protocol.

According to one embodiment, communications between the mobile terminal 1, the mobile network 4, the platform 2, the server of the service provider 3 and the banking system 11 use the http protocol. The hardware components corresponding to such an embodiment are represented in FIG. 2.

The mobile network 4 can consist in a GSM, GPRS, UMTS, LTE etc.—type mobile telephony network. Communications over this network can be secured, particularly by encryption of the exchanged data. By way of example the mobile telephony network represented in FIG. 1 is a mobile network of GSM type comprising a base station (BTS) 6 connected to the mobile terminal 1 and at least one register of the geographical locations of the subscribers (HLR or Home Location Register) 7. The HLR consists of a central database of the mobile network operator, including information relating to any user authorized to use this network and in particular his/her/its location in the network. The HLR particularly contains the following information characterizing the user him/her/itself: the IMSI (International Mobile Subscriber Identity) a unique user identifier, which is also registered/inscribed on the SIM card, the IMEI (International Mobile Equipment Identity) defining the Mobile Station used, or generally, the mobile telephone of the user, the MSISDN indicating the international call number via which the user can be contacted etc.

The mobile network also comprises a processing module 8 making it possible to generate an item of alias data from at least one user identifier associated with the secure element 5 such as the IMSI and/or the MSDISDN provided by the HLR 7. Such a processing module 8 can be included in a platform 9 for accessing the Internet network allowing terminals of the mobile network to access the Internet network via the mobile network or to be connected to such an entity 9. This access platform is commonly known as WISP (Wireless Internet Service Provider). Subsequently no discrimination will be made between the processing module 8 and the WISP platform.

The item of alias data can be the result of any transformation of this user identifier or these user identifiers, for example a transformation by application of a hash function. The transformation function is chosen so that the item of alias data obtained by transformation is unique and permanent, thus allowing a non-equivocal identification by the platform 2 of the physical person subscribing to the client account and also of the mobile terminal of the user. This item of alias data is used as unique identifier of the mobile terminal 1 of the user to the server 3 of the service provider.

The item of alias data can be generated at the moment of production and/or configuration of the user identification module, or else upon the first connection to the mobile network of the operator of a mobile terminal incorporating this user identification module. The item of alias data generated is stored in association with a user identifier in a database specific to the user. The item of alias data is permanent and does not change in the following connections to the mobile network. The item of alias data thus serves as an anonymized identifier of the mobile terminal and/or of the user of this mobile terminal and/or of the subscriber identification module of this terminal.

The platform 2 is designed to obtain this item of alias data, upon the set-up of the connection of the mobile terminal to the platform via the mobile network, and to transmit this alias to the server 3 of the service provider as identifier of the user in any communication between the mobile terminal and the server of the service provider. An embodiment using the HTTP (Hypertext Transfer Protocol) protocol is described below and illustrated with reference to FIGS. 2 and 3.

Via the mobile network, the mobile terminal sets up a connection with the platform. Upon this connection, the mobile terminal is identified by at least one connection device of the mobile network of the operator which obtains the user identifier associated with the mobile terminal.

In a first variant, for this purpose the user enters on the browser of his/her mobile terminal 1 a network address such as an IP address or an http address making it possible to connect to the platform 2. This address can then be added as a favorite. For example, a first HTTP request is sent by the terminal containing the URL (Uniform Resource Locator) corresponding to the platform: http://urlp/, where 'urlp' is the web domain managed by the platform.

In a second variant illustrated in FIGS. 4a to 4d, a unique USSD (Unstructured Supplementary Service Data) code 14, for example, #100# can have been defined to facilitate the connection of the mobile terminal 1 to the platform 2. The user can then enter the USSD code on the keyboard of his/her mobile terminal 1 and receive in reply a message allowing him/her to connect to the platform such as an SMS message 15 in the body of which the address of the platform 2 is found. Such an SMS can be replaced by any type of message processed by the mobile network 4 of the operator, for example a MMS.

The address entered is sent to the WISP 9 of the network of the operator. The WISP 9 only authorizes the access of mobile terminals 1 acknowledged by the mobile network 4, i.e. for which a user identifier can be obtained, for example by interrogating the user identification module 5. Any connection attempt by a terminal without a user identification module, or trying to connect from other networks such as the Internet is refused by the WISP.

The URL received is enriched by the WISP by inserting an item of alias data ('aa') therein and optionally an item of information about the location area 'xy'. The enriched URL is then for example in the form http://urlp/aa/xy/. The WISP 9 can then obtain these items of information by interrogating the devices of the mobile network of the operator such as the HLR 7 and the processing module 8. During such an interrogation, the WISP can provide an identifier of the mobile terminal: for example a user identifier contained in the user identifier module of the mobile terminal requiring a connection to the platform 2.

After identification of the mobile terminal by the mobile network of the operator following the request for connection of the mobile terminal to the platform and upon the set-up of the connection between the mobile terminal and the platform, the item of alias data associated with the user identifier of the mobile terminal in a process E1 is transmitted to the platform.

Figure 3:
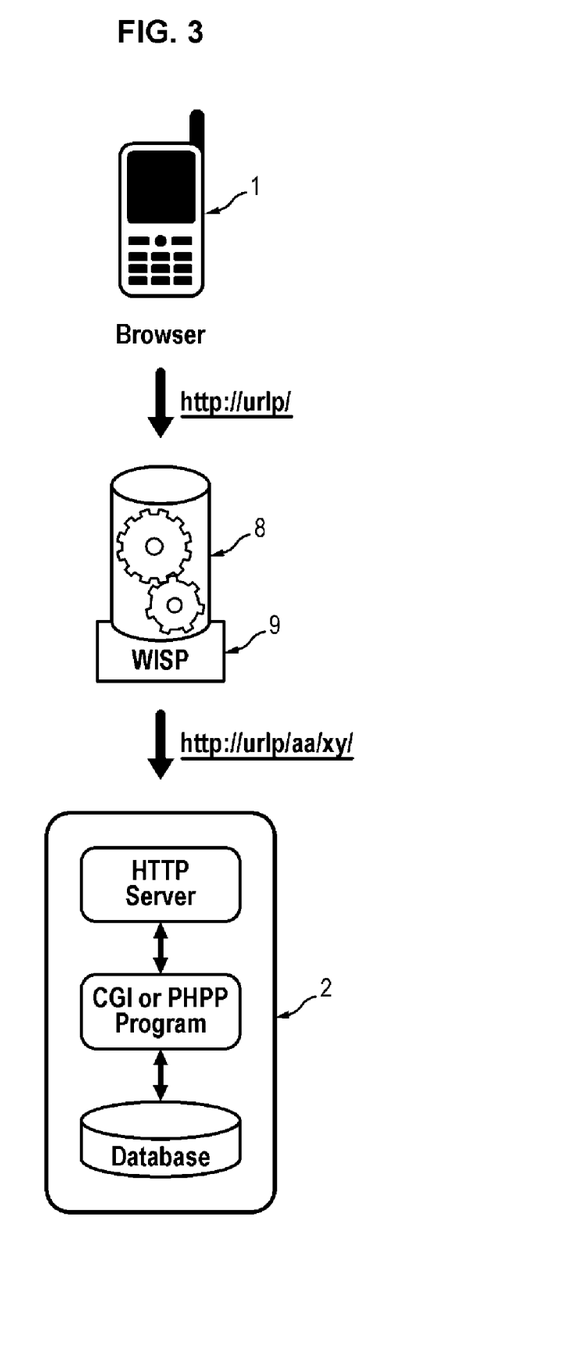
FIG. 3 illustrates an example of transmission of the item of alias data and the geographical coordinates of the mobile terminal to the platform.

The platform has no need to interrogate the mobile terminal to obtain an item of information about the location of the mobile terminal 1. No consent from the user of the mobile terminal 1 to the transmission of geolocation data is required since the platform 2 is one of the devices of the operator. The WISP 9 can also transmit to the platform 2 the identifier of the operator of the mobile network 4. These items of information can be transmitted to the platform 2 by the WISP (Wireless Internet Service Provider) of the mobile network 4 in the form of a url such as an http link, as illustrated in FIG. 3.

The platform thus receives the first HTTP request containing the enriched URL, and extracts therefrom the alias and the optional item of location area information. Thus the platform has no knowledge of the user identifier(s) used for the generation of the item of alias data.

Figure 4A:
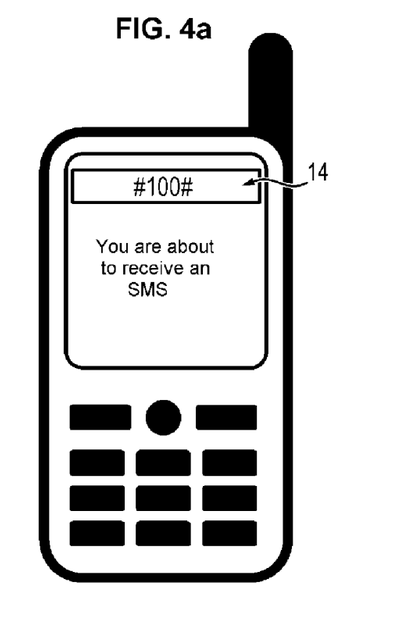
FIGS. 4a, 4b, 4c, 4d illustrate an example of access by a user of a mobile terminal to an available service with entering of a USSD code according to an embodiment.
Figure 4B:
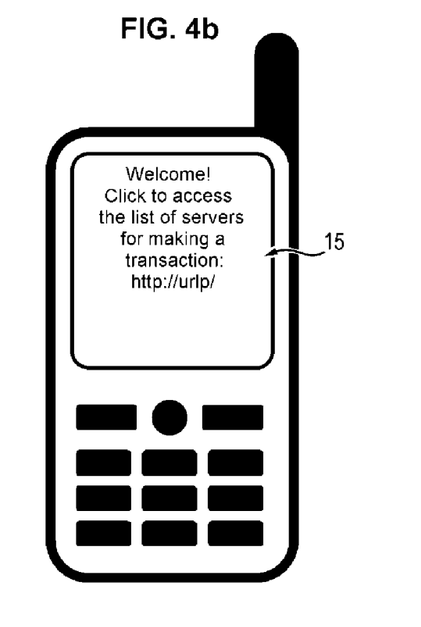
Figure 4C:
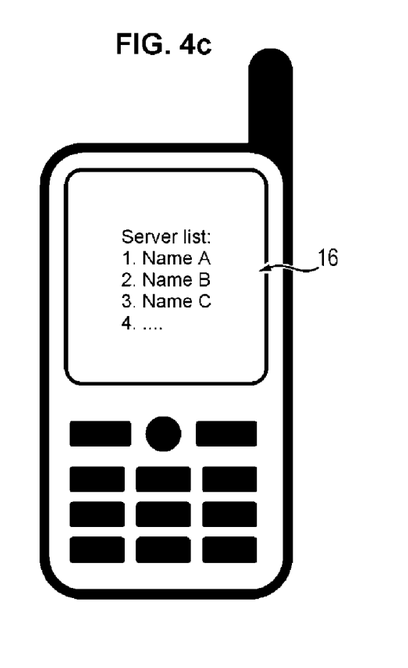

Then, the platform can propose to the mobile terminal a list of available servers to which the mobile terminal may wish to connect, i.e. with which the user of the terminal may wish to initiate a transaction by returning a list 16 of possible URLs corresponding to the different servers. Such a list can be established by the platform according to the item of information about the location area of the mobile terminal transmitted by the WISP. This list can then advantageously be ordered in increasing order of distance between the geographical location area of the mobile terminal 1 and the geographical location of the service provider as illustrated in FIG. 4c. In a variant, the platform 2 also returns a page including a list when it determines that a single server is available for the user. Alternatively, the platform can directly connect the mobile terminal to the only server available, in a given geographical area around the location of the mobile terminal for example, and transmit the first HTTP request to this server. If the platform 2 identifies that no server is available for the user, it returns to the mobile terminal 1 a page indicating that no server is available in the geographical area in which the user is found. To send messages to the mobile terminal, such as for example pages comprising lists of available servers, the platform can send these messages to the WISP accompanied by the item of alias data used to identify the recipient of the message.

When the platform directly routes the first HTTP request toward the only available server, it adds the Web domain 'url3a' managed by the available server and where applicable removes beforehand the item of location area information from the URL: http://urlp/url3a/aa/.

When the platform returns to the terminal a list of URLs, these URLs are in the form http://urlp/url3a
http://urlp/url3b
http://urlp/url3c where url3a, url3b, url3c are the web domains managed by the different servers 3a, 3b, 3c respectively.

When several servers are accessible, one server is selected from the transmitted list.

Figure 4D:
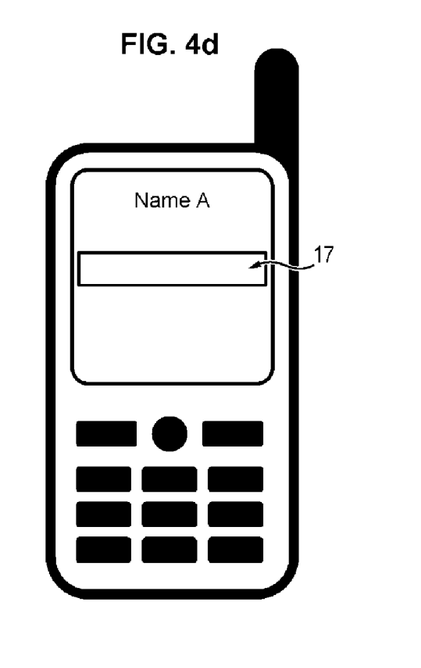

In a first variant, the user selects him/herself the server from a list displayed on the mobile terminal, for example by entering his/her choice in an input field 17 illustrated in FIG. 4d. A message identifying the server selected among the available servers is then transmitted from the mobile terminal 1 to the WISP. The WISP retransmits this message to the platform after having added to it the item of alias data identifying the mobile terminal of the user, and where applicable the item of information about the location area of the mobile terminal. These items of information can be transmitted by the WISP to the platform in the form of a URL such as an http address.

In a second variant, a server selection rule is applied in order to conduct an automatic selection of a server. The selection rule is for example based on criteria such as: proximity between the geographical location of the connection area of the mobile terminal and that associated with the server, order of preference defined between the servers, newness of the server, type of server (cinema, restaurant, supermarket etc.) or others. In this variant, it is the platform 2 that identifies at least one server selected from among the servers available determined by applying a selection rule. A confirmation can be requested of the user.

Following this identification of the selected server, the platform 2 can return to the terminal mobile 1 data relating to the selected server. For example, the platform 2 can return to the mobile terminal 1 a page of Internet page type. This page is then displayed by the browser of the mobile terminal 2 in order to deliver information to the user.

Upon the subsequent sending to the platform by the mobile terminal of an HTTP request intended for the server of the service provider 3, the WISP intercepts this HTTP request and inserts into it the item of alias data 'aa' and where applicable an item of location area information 'xy': http://urlp/url3a/aa/xy for example. Then the platform routes the HTTP request to the concerned server, after removal, where applicable, of the item of location area information from the URL: http://urlp/url3a/aa/.

The mechanism of enrichment of the HTTP request that has just been described will be used for all the requests emitted by the mobile terminal to the platform. For example, the commands that can be entered by the mobile terminal 1, such as the fact of clicking on a link or a button in a page sent by the service provider, are sent by the mobile terminal 1 to the WISP. The latter then retransmits them to the platform, replacing any information about the identity of the mobile terminal 1 by the item of alias data generated by the processing module 8 for the mobile terminal 1. The platform then retransmits these data paired with the item of alias data to the server of the service provider.

The platform 2 can also link the server of the service provider 3 with the mobile terminal 1 of the user for the provision of other service data than pages of Internet page type. It can transmit such service data accompanied by an item of alias data identifying their recipient to the WISP which, using its knowledge of the match between the item of alias data and the user identifier of the mobile terminal 1, can transmit such data to the mobile terminal 1 on behalf of the server of the service provider 3. The mobile terminal can thus have messages of SMS or MMS type transmitted. By way of example, the exchanges of such data between a server of a service provider, the platform and the WISP can be done via the FTP protocol or the SNPP protocol for example.

In a variant, the platform 2 can transfer a request for the sending of an electronic message such as an email on behalf of the service provider 3 accompanied by the item of alias data to the WISP which will undertake to transmit the electronic message to the recipient using its knowledge of the match between the item of alias data and the user identifier of the mobile terminal.

In another variant, the platform 2 can also set up a voice communication between the mobile terminal 1 identified by a first item of alias data and the server of the service provider 3 or another mobile terminal identified by a second item of alias data, following a request for a voice link issued by a server of a service provider. If the two items of alias data belong to a single operator, the platform transmits the voice link request accompanied by the two items of alias data to the single operator in question, who then undertakes to set up the voice communication between the caller and the callee.

If the two items of alias data belong to two different operators, the platform then transmits the callee voice link request accompanied by its item of alias data to the operator in question, and in return the latter sends back a temporary call number to the platform. The platform then transmits the second item of alias data of the caller as well as the temporary call number to the second operator, who undertakes to set up the voice communication between the caller and the callee.

The platform 2 can make available to the user a personal administration internet page to which the user can connect from his/her mobile terminal 1 to verify personal information such as his/her electronic mail (email) address, his/her identification code or his/her authentication code, and to correct these items of information if necessary. Optionally, the user can also specify on this page whether or not he/she agrees to receive messages from service providers by SMS, email, or voice communication and can also specify the maximum number of messages that he/she agrees to receive in this way over a given period, for example one week or one month.

Such an internet page is accessible from the mobile terminal 1 by connecting to the address of the public site of the platform. When processing a request for connection to this page by the network of the operator, the WISP adds to the url of this page the item of alias data identifying the user of the mobile terminal. Upon this first connection of a mobile terminal to this page, the platform creates a personal administration space linked to the item of alias data of the mobile terminal. In all subsequent connections, the platform will automatically give the user of the mobile terminal access to this personal space without the user having to provide an identifier or a password.

In a variant, such a page is an internet page accessible from any device connected to the Internet network. In order to be able to identify the personal space that he/she is seeking to access, the user sends from his/her mobile terminal an SMS containing a particular keyword to a predefined number. Upon the sending of this SMS to the platform, the operator replaces the number of the emitter by the item of alias data of the mobile terminal. Upon receiving the SMS, the platform transmits an identification code intended for the mobile terminal identified by its item of alias data. This code can be delivered to the mobile terminal in the form of an SMS according to the process described above. The entering by the user of the identification code on the internet page of the platform then allows him/her to access the administration space linked to his/her mobile terminal.

Figure 5:
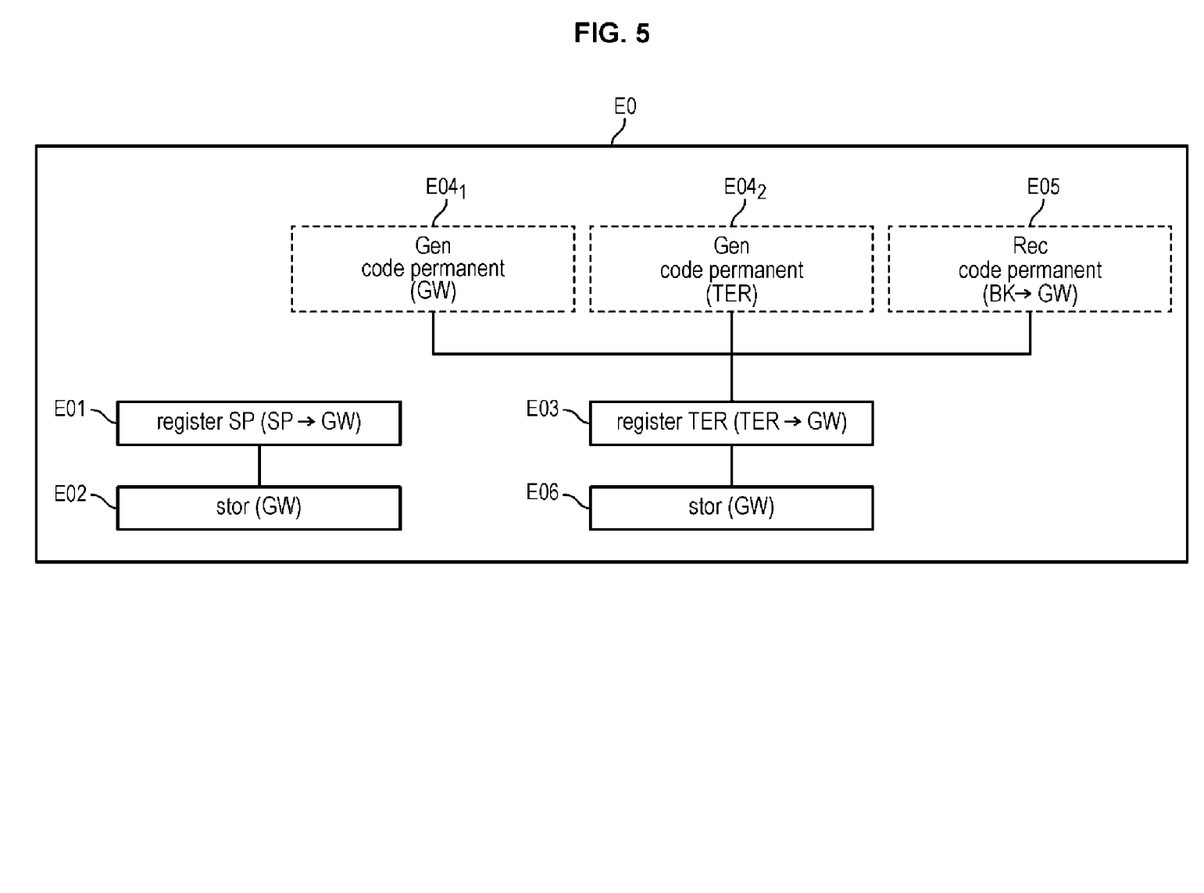
FIG. 5 is a diagram schematically representing an exemplary implementation of a storage phase of a method for securing a transaction according to an embodiment.

To allow the implementation of a secure and anonymous transaction between the user and the service provider, a first storage phase E0, represented in FIG. 5, is first of all implemented during which the user and the service provider can register with the platform to provide it with their identification code and during which the authentication code of the user can be defined so that it stores a match between the item of alias data and the code identifying the user to the transaction execution system 11.

The platform can furthermore store a match between the identifier of the service provider and the code for identifying the service provider to the transaction execution system 11.

Figure 6:
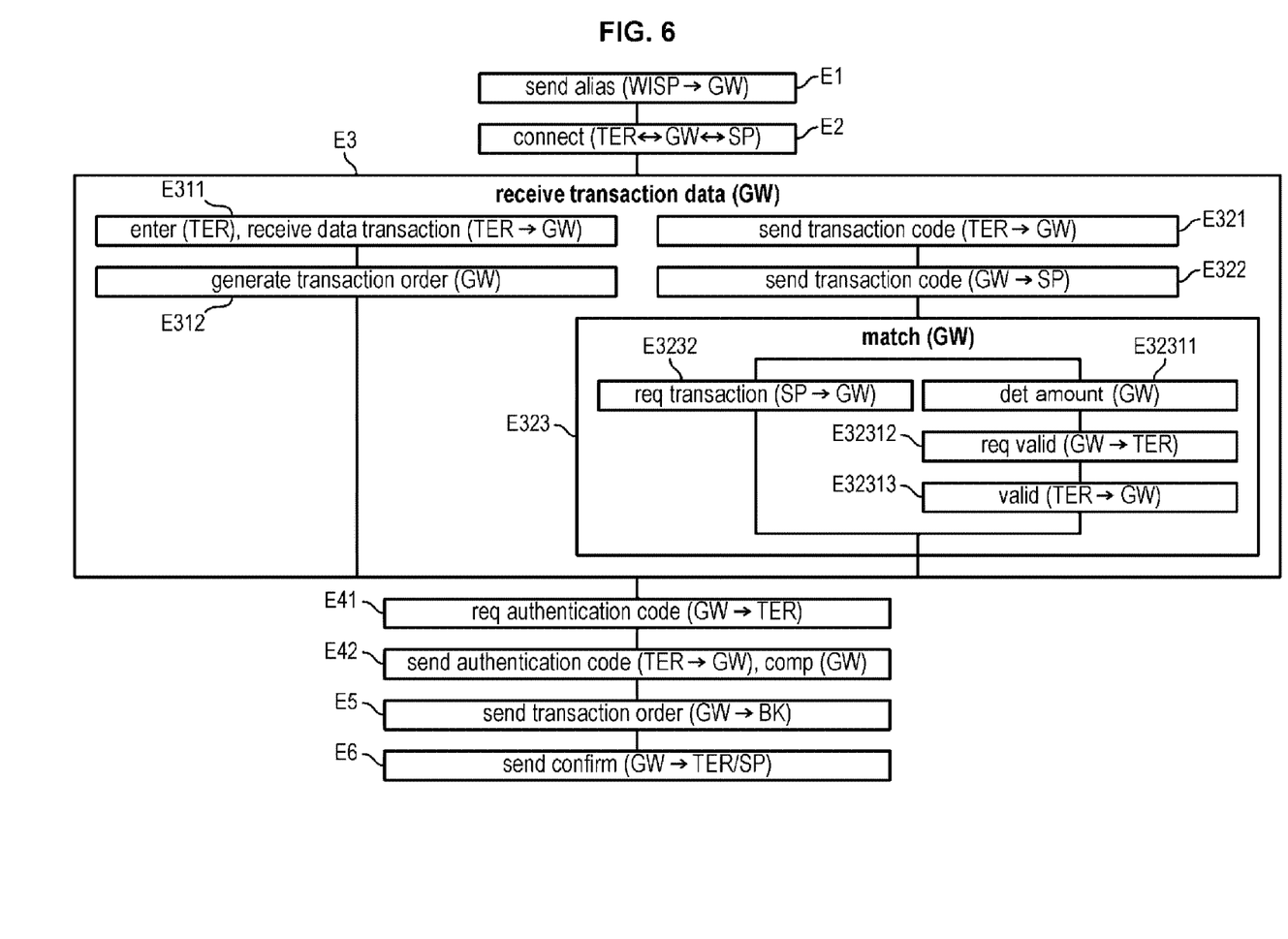
FIG. 6 is a diagram schematically representing an exemplary implementation of a transaction phase of a method for securing a transaction according to an embodiment.

A transaction phase, represented in FIG. 6, is then implemented during which the platform carries out the following processes:

reception E1 of the item of alias data upon the set-up of a connection between the mobile terminal and the platform through the mobile network and following an identification of the mobile terminal by the mobile network via said user identifier, linking E2, through the platform 2 and via the mobile network, of the mobile terminal of the user with the server of the service provider, said item of alias data serving to identify the mobile terminal to said server of the service provider, reception E3 of transaction data representing a transaction to be executed between the user of the mobile terminal and said service provider, transmission E5 to the transaction execution system 11 of an order to execute the transaction comprising said code for identifying the user and said code for identifying the service provider to the transaction execution system, so that the transaction execution system implements said transaction.

The processes executed in the implementation of the method are described in more detail in the following paragraphs.

Storage Phase

In a storage phase E0, the user and the service provider can register with the platform to be able to subsequently take part in a secure transaction.

This storage process E0 can comprise a first reception process E01 in which the platform receives a registration message from the service provider transmitted by the latter's server. This provider registration message can comprise the identification code of the service provider. During this process, the service provider can equally indicate a physical address characterizing the geographical location of his/her/its physical establishment. In a non-limiting embodiment, the physical address can correspond to the geographical center of a service activity without the service provider necessarily possessing a physical establishment at said address. One and the same service provider can register several geographically remote physical establishments or several geographically remote service activities.

The service provider can also provide an item of information such as a maximum distance of a user in relation to the geographical location indicated to set up a transaction, allowing the platform 2 to determine a geographical area of availability wherein the server of the service provider can be proposed to a user of a mobile terminal 1 on his/her connection to the platform. If no such item of information is provided, a geographical area corresponding to a disc centered on the geographical location indicated and having a default value as its radius can be used. Such a geographical area cannot exceed the territory covered by the operator of the mobile network 4. A geographical area can correspond to one or more location cells managed by the operator of the mobile network. The extent of the geographical area is thus variable and a function of the maximum range of the BTS of the cell(s) corresponding to the defined geographical area.

This storage process E0 can then comprise a first storage process E02 during which the platform stores in the storage device 16 the received identification code of the service provider, associated with the identifier of the service provider.

The platform thus stores the bank details of the service provider in a memory, in order to be able to subsequently communicate them to the banking system for the implementation of a transaction.

The enrolment process E0 can also comprise a second reception process E03 during which the platform receives a message of registration of the user of the mobile terminal transmitted by the latter. This user registration message can comprise the identification code of the user. According to the mechanism described above, this message also comprises the item of alias data of the user, inserted by the WISP, and identifying the mobile terminal of the user wishing to register with the platform.

The registration of the user can also require the definition of the authentication code of the user so that the latter can use it subsequently in a transaction to validate it.

In a first variant E041, the storage process E0 comprises a first process of code generation during which the authentication code of the user is generated by the platform and transmitted to the user.

In a second variant E042, the authentication code is generated by the user him/herself. He/she can choose it and enter it on his/her mobile terminal or else trigger a random generation of the authentication code by the mobile terminal. The authentication code generated can then be included in the registration message of the user of the mobile terminal transmitted by the latter to the platform in the second reception process E03.

In a third variant, the authentication code of the user is generated by the banking system. The storage process E0 can then comprise a third reception process E05 during which the platform receives an enrolment message from the banking system comprising the authentication code of the user generated by the banking system. The sending of this message by the banking system to the platform can follow on from the sending by the platform to the banking system of a request for the generation of an authentication code for the user. The authentication code can thus be defined as matching another already user known code and used by him/herself within the banking system, such as his/her banking card code or an identifier for access to a remote banking service, without however requiring the involvement of the user. It is thus also pointless to transmit a message indicating the authentication code chosen between the platform and the user, limiting the risks of interception of such message by a hacker.

Finally, the storage process E0 can comprise a second storage process E06 during which the platform stores in the storage device 16 the item of alias data of the user associated with his/her identification code and where applicable the authentication code of the user.

The platform thus stores for each registered user, whose mobile terminal is identified by its item of alias data, its code for identification to the banking system so that it can be transmitted to the banking system in a subsequent transaction, and where applicable its authentication code in order to verify the validation of the transaction by the user.

Transaction Phase

The following paragraphs describe the processes implemented during the transaction phase to securely execute a transaction between the user of the mobile terminal and the service provider, for a certain amount known as the transaction amount.

The transaction phase first of all comprises the process of receiving the item of alias data E1. During this process, the platform receives from the WISP the item of alias data associated with the mobile terminal that has requested its connection to the platform. The platform can verify that the user of the mobile terminal has indeed registered previously, i.e. that it holds an identification code associated with this item of alias data. In this process, the platform can propose to the mobile terminal a list of servers of service providers with which the mobile terminal may wish to enter into communication to initiate a transaction.

The linking process E2 allows the mobile terminal to enter into communication with the server of the service provider with which the user wishes to initiate a transaction, through the platform. No direct connection is set up between the mobile terminal and the server of the service provider and all the exchanges between these two entities go by the platform which retransmits each message to its recipient. The mobile terminal is only identified to the server of the service provider by the item of alias data, thus preserving the anonymity of the user. The connection of the mobile terminal to the server of the service provider through the platform can cause the displaying on the mobile terminal of the mobile site proposed by the server of the service provider. Such a page can suggest to the user of the mobile terminal a selection of products or services for which the user may wish to initiate a transaction by way of his/her mobile terminal.

The process E3 of reception of transaction data has the aim of defining the transaction, i.e. of linking:

the item of alias data of the user, identifying the mobile terminal of the user without revealing his/her/its identity, and with which the code for identifying the user to the transaction execution system is associated, the identifier of the service provider, identifying the service provider with whom/which the user of the mobile terminal wants to conduct a transaction, and with whom/which the code for identifying the service provider to the transaction execution system is associated, and the amount of this transaction.

The transaction data received by the platform can in particular comprise the amount of the transaction, an identification of at least one service or product to be supplied by the service provider or else a transaction code which identifies the transaction to be executed to the service provider.

The items of transaction data can be transmitted directly by the mobile terminal to the platform, for example in the case of a transfer, or else be defined in cooperation with the server of the service provider, for example in the case of a transaction resulting from a selection by the mobile terminal's user of a product or a service on the site of the service provider.

In a first variant, the process E3 of reception of transaction data can comprise a process of reception of transaction data coming from the mobile terminal E311 during which the platform receives transaction data originating from the mobile terminal following the entering of these transaction data, performed via the mobile terminal. The user of the mobile terminal can for example directly enter manually on his/her mobile terminal the amount of a transfer and an identifier of the service provider. The user can also use his/her mobile terminal to scan a barcode or else read an RFID tag in order to obtain an amount of an article or a service and an identifier of the service provider. The transaction data transmitted by the mobile terminal are accompanied by the item of alias data associated with it, inserted by the WISP into the message transmitted to the platform.

The process E3 of reception of transaction data can comprise a process E312 of generation of the order to execute the transaction on the basis of said received transaction data and the item of alias data. The platform can use the item of alias data to find the identification code of the user needed for the definition of the transaction. Similarly, it can use the identifier of the service provider to find the identification code of the service provider. Alternatively, if the transaction data do not contain any service provider identifier, the platform can select as service provider identification code for the transaction the identification code associated with the service provider with which the mobile terminal has entered into communication by way of the platform.

In a second variant, the user of the mobile terminal can initiate the transaction by entering a transaction code identifying the transaction to be executed to the service provider and corresponding to a certain transaction amount. This transaction code can have been generated by the server of the service provider and associated temporarily with a transaction amount. The transaction code can also identify a device capable of providing the transaction amount to said service provider.

The service provider can have communicated to the user of the mobile terminal said transaction code, optionally accompanied by the associated transaction amount. This transmission can for example be implemented orally or by the handing over of a paper invoice, such as a till receipt, or else by email or by a display on the screen in the case of a remote transaction. The user of the terminal thus becomes aware of the transaction code associated by the server of the service provider with the amount of the transaction that this user wants to conduct with the service provider.

Figure 7A:
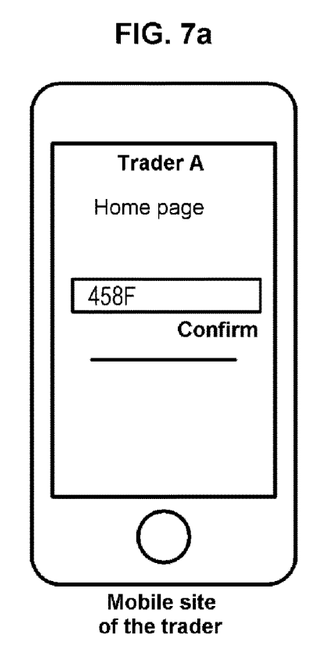
FIGS. 7a, 7b, 7c, 7d illustrate examples of displays on the user's mobile terminal for carrying out the method for securing a transaction between the user of the mobile terminal and a service provider according to an embodiment.

The process E3 of reception of transaction data then comprises a process E321 of reception by the platform of the transaction code transmitted by the mobile terminal. This code can have been entered on a page of the mobile site offered by the server of the service provider as represented in FIG. 7a.

The process E3 of reception of transaction data then comprises a process E322 of transmission by the platform of the transaction code to the server of the service provider with which the user's mobile terminal is connected. The service provider thus becomes aware that a user identified by his/her item of alias data wants to initiate a transaction with them for an amount corresponding to the transaction code transmitted.

The process E3 of reception of transaction data then comprises a process E323 of matching the item of alias data of the user of the mobile terminal, with the amount of the transaction and with the identifier of said service provider.

In a first variant the service provider can request to the platform to trigger the execution of the transaction between him/her/itself and the mobile terminal of the user identified by its item of alias data, for the transaction amount associated with the transaction code provided. The matching process E323 can then comprise a request process E3232 during which the platform receives a transaction request message transmitted by the server of the service provider and comprising the item of alias data of the user of the mobile terminal and the amount of the transaction. This request message can also comprise the identifier of the service provider, identifying the service provider to the platform, or else this identifier can be deduced by the platform of reception of the message, for example as a function of a code or an electronic address identifying vis-à-vis the platform the server of the service provider that transmitted the message. According to a mode of implementation, the server of the service provider can consist in a mobile terminal similar to that of the user, also connected to the platform by a mobile network and the identifier of the server of the service provider vis-à-vis the platform can be an item of alias data similar to that identifying the mobile terminal of the user. The platform then has no knowledge of the identity of the service provider either, and the WISP of the operator includes in all the messages transmitted by the server of the service provider to the platform the item of alias data of the service provider. The platform then carries out the matching of the item of alias data of the mobile terminal user, the amount of the transaction and the identifier of the service provider.

In a second variant, a validation of the amount of the transaction can be requested of the user before requesting the execution of the transaction from the platform. For this purpose, the matching process E323 can comprise a process E32311 of determination of the amount of said transaction corresponding to said received transaction code, and a process E32312 of transmission to the mobile terminal of a validation request message comprising the determined transaction amount. The platform can receive from the server of the service provider the amount associated with the transaction code and generate the validation request message. Alternatively, the platform can receive the validation request message directly and thus become aware of the amount of the transaction before retransmitting this message to the mobile terminal.

Figure 7B:
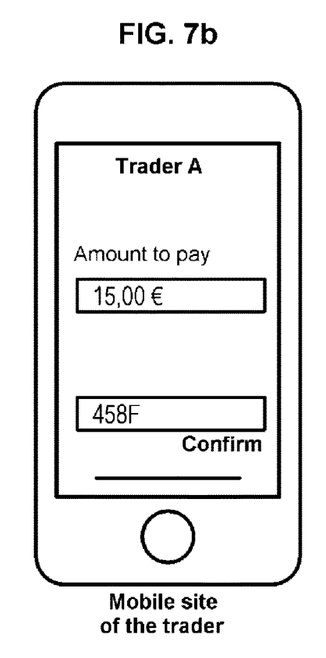

This validation request message can comprise the identifier of the service provider and the amount of the transaction. This validation request message can optionally recall the transaction code entered by the user, as represented in FIG. 7b. The matching process E1 then comprises a process E32313 of reception of a transaction validation message transmitted by the mobile terminal, said message comprising the item of alias data of the user of the mobile terminal, the amount of said transaction and the identifier of said service provider to the platform. This message automatically comprises the item of alias data of the user inserted by the WISP. The platform then carries out the matching E323 of the item of alias data of the user of the mobile terminal, the amount of the transaction and the identifier of the service provider.

The order to execute the transaction is only transmitted to the transaction execution system 11 in the process E5 of transmission of the order of execution if the validation message coming from the mobile terminal is received by the platform.

By the processes that have just been described, the platform becomes aware of the two parts of the transaction and of the amount thereof without the identity of the user of the mobile terminal being known to the service provider and without requiring the user of the mobile terminal to entering many data items. Indeed, once connected to the platform, the mobile terminal user has only to choose the service provider, if several are suggested to him/her by the platform, and to enter the transaction code.

When in the storage process E0 an authentication code relating to the user has been stored, the transaction phase can then comprise the processes of:
transmission E41 to the mobile terminal 1 of a request for the entering of said authentication code,
reception E42 of a code entered by said user and comparison of the code entered with the stored authentication code,
transmission E5 of the order to execute the transaction if the entered code and the stored authentication code are identical.

Figure 7C:
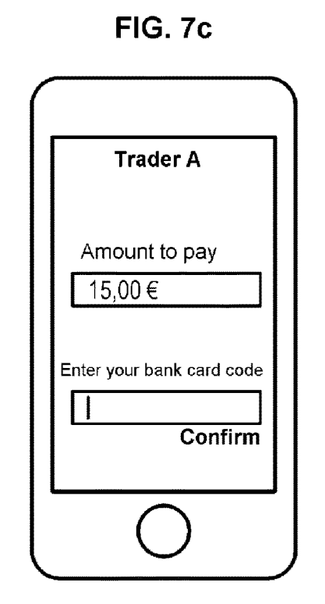

In the transmission process E41 the platform transmits to the mobile terminal of the user identified by the item of alias data a request to enter his/her authentication code, as represented in FIG. 7c. This request can comprise the identifier of the service provider and the amount of the transaction.

The knowledge by the user of his/her authentication code is then verified by comparing the authentication code entered by the user with the authentication code associated with the item of alias data of the mobile terminal user stored by the platform.

To do this, the user enters his/her authentication code on his/her mobile terminal to express his/her consent to the carrying out of a transaction and to prove that the transaction is not being conducted by an imposter who has stolen his/her mobile terminal.

The mobile terminal then transmits the authentication code entered by the user to the platform.

In a process E42, the platform compares the authentication code entered on the mobile terminal and transmitted by the mobile terminal and the authentication code stored by the platform in the storage device associated with the item of alias data of the user of the mobile terminal. If the comparison is positive, i.e. if the entered authentication code and the stored authentication code are identical, the user is authenticated and the platform can then command the execution of the transaction.

Finally, the transaction phase comprises the transmission process E5 during which the platform transmits to the transaction execution system an order to execute the transaction between the user and the service provider, this transaction order comprising the identification codes of the user and the service provider so that the banking system implements this transaction. The platform can find the identification codes of the user and of the service provider on the basis of the item of alias data of the user and of the identifier of the service provider and the associations stored in the storage device 10 in the first and second storage processes E02 and E06. This order of execution of transactions can be generated from transaction data received in the process E3 and particularly from the amount of the transaction, and from the item of alias data.

Figure 7D:
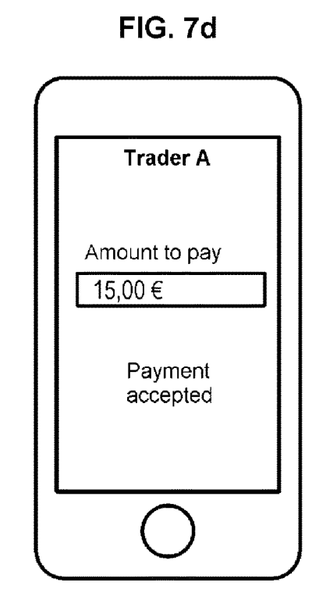

Once the transaction has been carried out successfully by the transaction execution system, the platform can receive a confirmation message from the transaction execution system. The platform can then, in a process E6 of sending a confirmation, transmit to the mobile terminal and/or to the service provider a message of confirmation of transaction success, as represented in FIG. 7d. The confirmation message transmitted to the mobile terminal can be an email or an SMS. The confirmation message transmitted to the service provider can be an email, but also an SMS if the service provider is endowed with a mobile terminal, for example if the server of the service provider is itself a mobile terminal.

A transaction can thus be carried out in a secure way, on a distinct network of the Internet, without the identity or the banking details of the user of the mobile terminal being revealed to the service provider, without requiring this user to enter many data on his/her mobile terminal, and without requiring a fixed and/or dedicated infrastructure on the side of the service provider.

The invention claimed is:

1. A method for securing a transaction between a mobile terminal of a user and a server of a service provider through a platform capable of being connected to the mobile terminal via a mobile network of an operator, to the server of the service provider and to a transaction execution system, the method comprising the following processes implemented by the platform:

storage of a match between an item of alias data, associated with a user identifier via which the mobile terminal is identified to the mobile network of the operator, and a code for identifying the user to the transaction execution system;

reception of the item of alias data upon the setting up of a connection between the mobile terminal and the platform through the mobile network and following the identification of the mobile terminal by the mobile network via the user identifier;

linking of the mobile terminal of the user with the server of the service provider through the platform and via the mobile network, the item of alias data serving to identify the mobile terminal to the server of the service provider, to connect the mobile terminal of the user to the server of the service provider through the platform, the connection being implemented such as each data transmitted, using the connection, from one of the mobile terminal of the user and the server of the service provider to one of the server of the service provider and the mobile terminal of the user are transmitted through the platform;

reception, within the connection, of transaction data representing a transaction to be executed between the user of the mobile terminal and the service provider; and transmission to the transaction execution system of an order to execute the transaction comprising the user identification code associated with the alias used to set up the connection and a code identifying the service provider to the transaction execution system, so that the transaction execution system implements the transaction.

2. The method according to claim 1, wherein the match storage process comprises the storage of a match between an identifier of the service provider and said code for identifying the service provider to the transaction execution system.

3. The method according to claim 1, wherein the transaction data comprise a transaction code which identifies the transaction to be executed to the service provider.

4. The method according to claim 1, wherein the transaction data comprise an identification of at least one service or product to be provided by the service provider.

5. The method according to claim 1, wherein the transaction data comprise a transaction amount.

6. The method according to claim 1, comprising the following processes:

storage of a user authentication code in association with the identification code of the user, transmission to the mobile terminal of a request for the entering of said authentication code, reception of a code entered by said user and comparison of the code entered with the stored authentication code, and transmission of the order to execute the transaction if the code entered and stored the authentication code are identical.

7. The method according to claim 1, wherein the process of reception of transaction data comprises:

the reception of transaction data originating from the mobile terminal following the entering of said transaction data performed via said mobile terminal, and the generation of said order to execute the transaction on the basis of said received transaction data and the item of alias data.

8. The method according to claim 3, wherein the process of reception of the transaction data comprises the reception and the transmission to the server of the service provider of the transaction code following the entering of said transaction code performed via said mobile terminal.

9. The method according to claim 8, wherein said transaction code is associated with an amount of the transaction, following the reception of said transaction code, the process of reception of the transaction data comprises a matching of the item of alias data of the user of the mobile terminal, with the amount of the transaction and with the identifier of said service provider.

10. The method according to claim 9, wherein the matching process further comprises the following prior processes:

determination of the amount of said transaction matching said received transaction code;

transmission to the mobile terminal of a validation request message comprising the determined transaction amount;

reception of a transaction validation message transmitted by the mobile terminal, said message comprising the item of alias data of the user of the mobile terminal, the amount of said transaction and the identifier of said service provider to the platform; and wherein the order to execute the transaction is transmitted to the transaction execution system if the validation message coming from the mobile terminal is received by the platform.

11. The method according to claim 9, wherein the matching process further comprises the prior reception of a transaction request message transmitted by the server of the service provider, said message comprising the item of alias data of the user of the mobile terminal, an amount of said transaction and the identifier of said service provider to the platform.

12. The method according to claim 8, wherein the transaction code is a code associated temporarily by the server of the service provider with the transaction amount or a code identifying a device capable of supplying the transaction amount to said service provider.

13. The method according to claim 1, wherein the user identifier is an identifier associated with a user identification module of the mobile terminal.

14. The method according to claim 1, wherein the linking is carried out securely through a virtual private network set up between the platform and the server of the service provider.

15. The method according to claim 1, wherein the storage process further comprises a prior process of reception of a message of registration of said service provider transmitted by said server of the service provider and comprising the identification code of the service provider.

16. The method according to claim 1, wherein the storage process further comprises a prior process of reception of a message of registration of the user of the mobile terminal transmitted by the mobile terminal and comprising the identification code of the user.

17. The method according to claim 16, wherein the storage process further comprises a prior process of reception of a message of registration of the user of the mobile terminal transmitted by the mobile terminal and comprising an authentication code of the user.

18. A system for securing a transaction between a mobile terminal of a user and a server of a service provider through a platform capable of being connected to the mobile terminal via a mobile network of an operator, to the server of the service provider and to a transaction execution system, the system comprising:
- a non-transitory physical storage device configured to store a set of instructions;
- a hardware processor configured to execute the set of instructions that cause the processor to:
  - store a match between an item of alias data, associated with a user identifier via which the mobile terminal is identified to the mobile network of the operator, and a code for identifying the user to the transaction execution system,
  - receive the item of alias data upon the setting up of a connection between the mobile terminal and the platform through the mobile network and following the identification of the mobile terminal by the mobile network via the user identifier;
  - link the mobile terminal of the user with the server of the service provider through the platform and via the mobile network, the item of alias data serving to identify the mobile terminal to the server of the service provider, to connect the mobile terminal of the user to the server of the service provider through the platform, the connection being implemented such as each data transmitted, using the connection, from one of the mobile terminal of the user and the server of the service provider to one of the server of the service provider and the mobile terminal of the user are transmitted through the platform;
  - receive, within the connection, transaction data representing a transaction to be executed between the user of the mobile terminal and the service provider; and
  - transmit to the transaction execution system an order to execute the transaction comprising the user identification code associated with the alias used to set up the connection and a code identifying the service provider to the transaction execution system, so that the transaction execution system implements the transaction.

19. A platform capable of being connected to a mobile terminal of a user via a mobile network of an operator, to a server of a service provider and to a transaction execution system, and of securing a transaction between said mobile terminal of said user and said server of said service provider,
wherein it is capable of being linked to a storage device to store a match between an item of alias data, associated with a user identifier via which the mobile terminal is identified to the mobile network of the operator, and a code for identifying the user to the transaction execution system,
and wherein it comprises:
- a non-transitory physical storage device configured to store a set of instructions;
- a hardware processor;
- a plurality of first instructions stored in the non-transitory physical storage devices that, when executed by the hardware processor, cause the hardware processor to receive the item of alias data upon the setting up of a connection of the mobile terminal to the platform through the mobile network and following the identification of the mobile terminal by the mobile network via the user identifier;
- a plurality of second instructions stored in the non-transitory physical storage devices that, when executed by the hardware processor, cause the hardware processor to link, through the platform and via the mobile network, the mobile terminal of the user with the server of the service provider, the item of alias data serving to identify the mobile terminal to the server of the service provider to connect the mobile terminal of the user to the server of the service provider through the platform, the connection being implemented such as each data transmitted, using the connection, from one of the mobile terminal of the user and the server of the service provider to one of the server of the service provider and the mobile terminal of the user are transmitted through the platform;
- a plurality of third instructions stored in the non-transitory physical storage devices that, when executed by the hardware processor, cause the hardware processor to receive, within the connection, transaction data representing a transaction to be executed between the user of the mobile terminal and the service provider; and
- a plurality of fourth instructions stored in the non-transitory physical storage devices that, when executed by the hardware processor, cause the hardware processor to transmit to the transaction execution system an order to execute the transaction comprising the identifier code associated with the alias used to set up the connection of the user and a code for identifying the service provider to the transaction execution system, so that the transaction execution system implements said transaction.

* * * * *